2,519,914

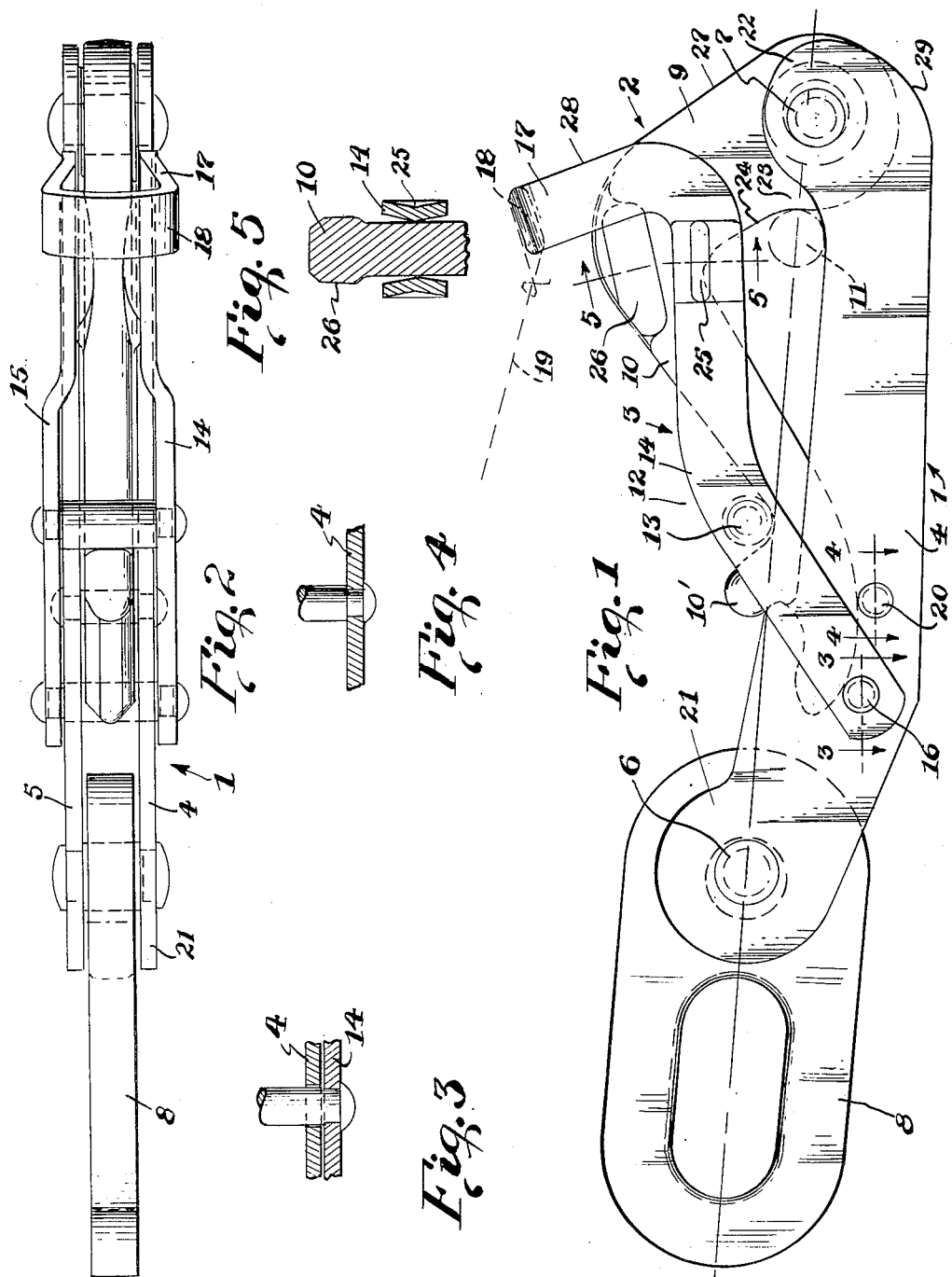
Aug. 22, 1950  W. R. MacCLUNEY  2,519,914
FASTENING DEVICE
Filed July 19, 1945
INVENTOR.
WILLIAM ROBERT MacCLUNEY Patented Aug. 22, 1950

UNITED STATES PATENT OFFICE 2,519,914

FASTENING DEVICE

William Robert MacCluney, Dearborn, Mich.

Application July 19, 1945, Serial No. 605,872

3 Claims. (Cl. 294—83)

The invention relates to fastening devices and refers more particularly to pelican hooks.

The invention has for one of its objects to provide an improved fastening device which is safe and reliable in operation and may be readily released.

The invention has for another object to provide an improved fastening device which is so constructed that the tension line caused by the load passes through the attaching means of the frame and also the pivot for connecting the frame to the member which cooperates with the frame to form an eye for receiving the attachment member.

The invention has for a further object to provide an improved fastening device in which the cooperating member is formed to engage the attachment member between the attaching means and the pivot between the frame and the cooperating member.

The invention has for other objects to provide the fastening device with retaining means which is provided with a lateral actuating extension to increase the leverage for moving the retaining means to released position; and to form the fastening device so that liability of accidental release is practically eliminated.

These and other objects of the invention will become apparent from the following description taken in connection with the accompanying drawings, in which Figure 1 is a side elevation of a fastening device embodying the invention;

Figure 2 is an edge elevation thereof;

Figures 3, 4 and 5 are cross sections on the lines 3—3, 4—4 and 5—5, respectively, of Figure 1.

While the fastening device embodying the invention may be used in various lines of work, it is particularly adapted for use in life saving equipment. The fastening device is a pelican hook comprising the frame 1, the curved member 2 and the retaining means 3.

The frame 1 is formed of the spaced substantially parallel frame members 4 and 5 which are fixedly secured together at and intermediate their ends. 6 and 7 are shoulder pins extending through the end portions of the frame members and having shoulders engaging the frame members to space the latter. The pin 6 forms an attaching means and, as illustrated in the present instance, the pin forms a pivot loosely engaged by the link 8. The curved member 2 is an L-shaped member having the arm 9 extending between the frame members 4 and 5 and loosely engaging the pin 7 which forms a pivot for the curved member. The curved member also has the arm 10 extending transversely of the arm 9 and adapted in the closed position of the curved member to extend between the frame members 4 and 5. The curved member 2 cooperates with the frame in the closed position of the curved member to form an eye for receiving an attachment member 11, such as a sling link. The retaining means 3 comprises the one-piece retaining member 12 and the shoulder pin 13, which latter is engageable with the arm 10 to hold the curved member 2 in closed position. The retaining member has the spaced substantially parallel arms 14 and 15 which embrace the frame 1 and are pivotally connected to the frame by means of the shoulder pin 16 which loosely extends through the frame members 4 and 5 and has shoulders abutting the arms 14 and 15 to secure them in fixed spaced relation. The shoulder pin 13 also extends between the arms 14 and 15 and has shoulders abutting these arms to hold them in fixed spaced relation. The retaining member also has at the free ends of its arms the lateral parts 17 which are connected by the transverse part 18. The lateral parts extend in a direction away from the frame 1 and with the transverse part form a lateral actuating extension engaged by a suitable rope or lanyard 19 for moving the retaining means to released position by swinging the same about the pin 16. The arrangement is such that the lateral actuating extension provides increased leverage for swinging the retaining means to released postion.

20 is a shoulder pin extending between the frame members 4 and 5 and having shoulders abutting the same to secure them in fixed spaced relation, this pin being located intermediate the ends of the frame and preferably between the pins 16 and 7 and in position to engage the arm 10 and limit the closing movement of the curved member 2.

The shoulder pins 6, 7, 13, 16 and 20 are riveted over at their ends to permanently secure together the parts forming the pelican hook.

For the purpose of locating the attachment member 11 between the pivot pins 6 and 7 with the tension line resulting from the load of the attachment member passing through the pivot pins and substantially through their axes, the frame members 4 and 5 are provided at their ends with the lateral extensions 21 and 22 extending in the direction of the curved member 2 and the curved member has its arm 9 generally inclined toward the pivot pin 6. The face or edge of the arm 9 engageable with the attachment member is formed with the portion 23 crossing the tension line and extending substantially at right angles thereto and with the portion 24 inclined from the portion 23 generally in a direction toward the pivot pin 6 when the curved member 2 is in closed position. This construction makes the pelican hook reliable in operation, the curved member when swinging to open position moving the attachment member so that its release is assured.

To resiliently hold the retaining means 3 in position to hold the curved member 2 in closed position the arms 14 and 15 of the retaining member 12 are made resilient and are formed with the opposite projections 25 which are adapted to pass over the opposite projections 26 upon the curved member 2 and to occupy a position between the projections 26 and the frame members when the parts are in operative position. The arms 14 and 15 resiliently flex while the projections 25 are being passed over the projections 26.

The retaining means 3 is constructed to also assist in carrying load exerted through the attachment member 11, it having the shoulder pin 13 located near the tension line resulting from the load and engageable with the adjacent edge of the projection 10' upon the arm 10 of the curved member 2. Also, the line connecting the shoulder pins 13 and 16 extends generally in the direction of the tension line with the shoulder pin 16 located nearer the shoulder pin 6 so that the retaining means is under tension when it carries part of the load. For a normal load there is preferably a slight clearance between the shoulder pin 13 and the projection 10' so that the normal load is carried by the frame members 4 and 5 independently of the retaining means 3. However, if the load is greater the retaining means then serves to assist in carrying part of the load, the curved member 2 bending until the projection 10' engages the shoulder rivet 13.

To practically eliminate liability of fouling of the pelican hook and also to practically eliminate liability of accidental release, the exposed faces or edges 27 and 28 of the arm 9 and the lateral parts 17 of the actuating extension extend at an angle to the tension line and are inclined generally in a direction toward the pivot pin 6. Also they are in substantial continuation of each other and cooperate with the exposed faces or edges 29 of the frame members to form a V. The junctions between the arms and lateral parts of the retaining member overlie the curved member. The arrangement is such that when the pelican hook comes into contact with an obstruction, such as a rope, either the obstruction or the pelican hook itself is deflected.

The construction of pelican hook locates the tension line resulting from the load of the attachment member to pass through the pivot for the curved member at a slight distance from the axis of the pivot. As a result, the load exerts a force on the curved member, some of which is transmitted to the pivot and then to the frame members and some of which tends to swing the curved member about the pivot and, if sufficient, bends the curved member to engage its projection with the shoulder pin of the retaining means so that the latter assists in carrying the load. This enables reducing in size and weight the portion of the frame having the pivot for the curved member and also enables forming the pivot for the curved member of smaller size and less weight than the pivot forming the attaching means. Consequently the pelican hook itself of of smaller size and less weight to carry a given load. In addition, the construction is such that the pelican hook is safe and reliable in operation, may be readily released and is relatively free of being accidentally released.

What I claim as my invention is:

1. A fastening device comprising spaced substantially parallel frame members, a curved member pivoted between and cooperating with said frame members in the closed position of said curved member to form an eye for receiving an attachment member, a one-piece retaining member pivoted to said frame members and having spaced arms embracing said frame members and curved member in the closed position of the latter, a shoulder pivot pin for said retaining member extending through said frame members and having shoulders abutting said arms, and a shoulder pin for assisting in securing said frame members in spaced substantially parallel relation, said second mentioned pin forming a stop for limiting closing movement of said curved member.

2. A fastening device comprising a frame, a member pivoted to and coperating with said frame in the closed position of said member to form an eye for receiving an attachment member, a one-piece retaining lever directly pivoted to said frame, means on said retaining lever engageable with said member for holding said member in closed position, said retaining lever having resilient spaced arms embracing said member in the closed position thereof and means on said resilient arms and member compelling said arms to flex whereby said retaining lever is locked in retaining position.

3. A fastening device comprising a frame, a curved member pivoted to and cooperating with said frame in the closed position of said member to form an eye for receiving an attachment member, a one-piece retaining lever having resilient spaced arms pivotally connected to said frame, lateral parts extending from the opposite ends of said arms and a transverse part connecting said lateral parts, said retaining lever overlying said curved member in the closed position thereof, and projections on said curved member engageable with said arms during movement of said lever to retaining position to compel said arms to flex whereby said retaining lever is locked in retaining position.

WILLIAM ROBERT MacCLUNEY.

REFERENCES CITED

The following references are of record in the file of this patent:

UNITED STATES PATENTS

| Number | Name | Date |
|---|---|---|
| 233,698 | Rankin | Oct. 26, 1880 |
| 462,721 | Monroe | Nov. 10, 1891 |
| 608,683 | Johnson | Aug. 9, 1898 |
| 706,248 | Merches | Aug. 5, 1902 |
| 837,948 | McIntosh | Dec. 11, 1906 |
| 916,005 | Owen | Mar. 23, 1909 |
| 1,498,239 | Hudgins | June 17, 1924 |
| 1,786,523 | Doering | Dec. 30, 1930 |
| 1,849,816 | Yingling | Mar. 15, 1932 |
| 2,313,802 | Carlsen | Mar. 16, 1942 |
| 2,328,341 | Higgins | Aug. 31, 1943 |

FOREIGN PATENTS

| Number | Country | Date |
|---|---|---|
| 326,212 | France | May 19, 1903 |
| 16,496 | Great Britain | July 18, 1913 |
| 202,400 | Great Britain | Aug. 20, 1923 |